United States Patent [19]

Starner et al.

[11] Patent Number: 5,426,157

[45] Date of Patent: Jun. 20, 1995

[54] FLEXIBILIZED POLYEPOXIDE RESINS INCORPORATING POLY-N-METHYLATED SECONDARY AMINES

[75] Inventors: William E. Starner, Nesquehoning; John A. Marsella, Allentown; Richard S. Myers, Kutztown, all of Pa.

[73] Assignee: Air Products and Chemicals, Inc., Allentown, Pa.

[21] Appl. No.: 213,647

[22] Filed: Mar. 16, 1994

[51] Int. Cl.$^6$ ............................................. C08G 18/04
[52] U.S. Cl. .................................. 525/452; 525/528; 525/529; 525/920; 528/110; 528/120; 528/123; 528/369
[58] Field of Search ............... 528/120, 123, 110, 369; 525/452, 528, 529, 920

[56] References Cited

U.S. PATENT DOCUMENTS

| | | | |
|---|---|---|---|
| 2,642,412 | 6/1953 | Newey et al. | 528/121 |
| 3,280,043 | 10/1966 | Larson et al. | 528/123 |
| 3,299,169 | 1/1967 | Smith | 260/830 |
| 3,567,677 | 3/1971 | Webb | 260/37 |
| 4,277,390 | 7/1981 | Kulier et al. | 260/37 EP |
| 4,521,583 | 6/1985 | Kohli | 528/119 |
| 4,552,814 | 11/1985 | Cavitt et al. | 428/414 |
| 4,608,313 | 8/1986 | Hickner et al. | 428/414 |
| 4,618,658 | 10/1986 | Hefner, Jr. et al. | 525/454 |
| 5,098,070 | 3/1992 | Takahashi | 266/157 |
| 5,232,996 | 8/1993 | Shah et al. | 525/452 |

FOREIGN PATENT DOCUMENTS

| | | |
|---|---|---|
| 3803508 | 8/1989 | Germany . |
| 2103222 | 4/1990 | Japan . |
| 2103223 | 4/1990 | Japan . |

*Primary Examiner*—Frederick Krass
*Attorney, Agent, or Firm*—Russell L. Brewer; Mary E. Bongiorno

[57] ABSTRACT

This invention relates to improved polyepoxide resins having enhanced physical and elastic properties. The polyepoxide resins comprise a polyepoxide resin based on a polyglycidyl ether of a phenolic-type compound and an acrylate-terminated urethane prepolymer. The improvement in the polyepoxide resin formulation comprises incorporating a polymethylated amine curative having two secondary amine hydrogens represented by the formula:

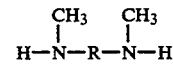

wherein R is alkylene or polyalkylene polyamine having from 2 to 20 carbon atoms. The presence of the aliphatic amine reactive component along with the acrylate-terminated urethane prepolymer results in an epoxy resin having enhanced properties.

4 Claims, No Drawings

FLEXIBILIZED POLYEPOXIDE RESINS INCORPORATING POLY-N-METHYLATED SECONDARY AMINES

FIELD OF THE INVENTION

This invention pertains to epoxy resins having enhanced flexibility and elongation.

BACKGROUND OF THE INVENTION

Civil engineering and industrial coating industries require economical, environmentally safe resin systems which cure at ambient temperature and give good elastomeric properties without compromising the moisture and chemical resistance. Concrete structures, for example, require coatings which are able to withstand impact as well as cover shrinkage-induced cracks which may be present therein.

Aromatic polyepoxide resins, particularly those based upon the use of polyglycidyl ethers of bisphenol A, have widely been used for preparing cast resins and coatings for civil engineering applications. Some of the reasons for success of epoxy resins in these applications is due to their moisture and chemical resistance as well as their ability to bond to a variety of substrates. When the polyepoxide resins are cured with polyamides, the resins, although resistant to chemicals, generally lack elasticity for a multitude of applications and when cured with amines the polyepoxide resins lose their flexibility and impact strength.

Historically, flexibility in an epoxy resin formulation has been obtained through the use of coal tar or similar additives. Flexibility has also been imparted to an ambient cured epoxy by making gross changes in the cured epoxy structure. These changes typically have been accomplished by the following methods. (1) modifying the aromatic character to a more aliphatic character; (2) reducing the cross-link density by using a curative with lower functionality or using a high excess of curative; and (3) adding long chain modifiers or flexibilizers in the form of resin, curative, or reactive additive. To achieve flexibilization of the epoxy resin pursuant to method 3, often flexibilizers in excess of sixty percent by weight of the formulation may be required or plasticizers such as nonylphenol or benzyl alcohol may be used to reduce the concentration of flexibilizer. The use of plasticizers leads, of course, to the presence of fugitive materials.

Representative patents which describe polyepoxide resins and the approach to enhancing the physical properties of the polyepoxide resins are as follows:

U.S. Pat. No. 5,098,780 discloses a formulation for enhancing the crack bridging ability in a lining for concrete surfaces. The crack bridging formulation comprises an epoxy resin, a flexibilizing agent, e.g., a phenol blocked isocyanate, an adhesion promoter, e.g., urethane acrylate and a curative, e.g., a modified cycloaliphatic polyamine adduct or a tertiary amine.

U.S. Pat. No. 3,567,677 discloses the preparation of epoxide portable encapsulated electrical connectors having high flexibility. The compositions comprise diglycidyl ethers of bisphenol A, diepoxides of a polyglycol, and at least one amine curing agent. Formulations include diglycidyl ethers of bisphenol A, diepoxides of polyglycols and amine curatives, including amine curatives adducted with phenylglycidyl ether in a 1:1 molar ratio.

U.S. Pat. No. 4,608,313 discloses epoxy resins crosslinked with polyisocyanates which are resistant to chipping by stone. Aliphatic diepoxides and aromatic diepoxides are utilized in the stone resistant epoxy formulations with the aliphatic diepoxides being glycidyl ethers of polyoxyalkylene glycols generated by reacting an aliphatic initiator with propylene oxide or butylene oxide.

U.S. Pat. No. 4,552,814 discloses chip-resistant epoxy resins particularly adapted for protective coatings on automobiles. The formulations incorporate polyglycidyl ethers of compounds having aliphatic hydroxyl groups such as glycidyl ethers of ethylene and propylene glycol as well as the glycidyl ethers of polyoxypropylene and polyoxyethylene glycol.

U.S. Pat. No. 3,299,169 discloses epoxy resins having improved flexibility while retaining good tensile strength comprising glycidyl ethers of bisphenol A, a diglycidyl ether of a polyglycol and a polyoxyalkylenediamine curing agent.

U.S. Pat. No. 4,277,390 discloses high molecular weight polyepoxides which have high impact strength, good heat resistance, chemical stability, as well as high elasticity and low brittleness. The patentees combine (polypropylene glycol)diurethanediepoxide with polyglycidyl ethers of bisphenol A and effect curing with an amine curing agent, e.g., methylene dianiline.

U.S. Pat. No. 4,618,658 discloses a vinyl ester resin composition comprising a polymer modified epoxy resin having polymerizable ethylenic unsaturation, a vinyl terminated urethane oligomer and at least one polymerizable ethylenically unsaturated compound. Curing was effected through the polymerization of the ethylenic unsaturated groups.

U.S. Pat. No. 4,521,583 discloses curable epoxy resins comprising substituted bisurea catalyzed epoxide prepolymers in combination with aromatic polyamine curing agents. The bisurea compound comprises the reaction product of an aryl monoisocyanate and an organic diamine. Representative diamines include diprimary, disecondary and mixed diprimary and disecondary amines which are then reacted with aryl monoisocyanate such as phenylisocyanate and 4-methylphenylisocyanate.

SUMMARY OF THE INVENTION

This invention relates to improved polyepoxide resins having enhanced flexible and elastic properties. The polyepoxide resins comprise a polyepoxide resin based on a polyglycidyl ether of a phenol, a flexibilizer selected from the group consisting of acrylate terminated urethanes or a diglycidylethers of polyalkyleneoxide oxide glycols and an amine curative. The improvement in the polyepoxide resin formulation comprises incorporating a polymethylated secondary amine having two epoxide reactive hydrogen atoms represented by the formula as the amine curative:

wherein R is alkylene or polyalkylene polyamine having from 2 to 20 carbon atoms.

There are several advantages associated with the cured polyepoxide resin of this invention and these advantages include:

an ability to produce a curable formulation having excellent chemical and moisture resistance which is well suited for civil engineering and industrial coating applications;

an ability to produce a product polyepoxide resin which has excellent flexibility and impact strength thus enhancing its effectiveness for use in civil engineering applications involving the use of concrete;

an ability to produce a product polyepoxide resin which has a high degree of elongation and elasticity with low levels of flexibilizer;

an ability to formulate a cured polyepoxide resin which has low volatile organic content (VOC), thus minimizing environmental dangers associated with many flexibilized polyepoxide resin systems; and, an ability to form environmentally compatible polyepoxide resins curable at ambient temperature.

DETAILED DESCRIPTION OF THE INVENTION

In producing a formulation for the curable polyepoxide resin, a recommended formulation for producing the flexibilized polyepoxide resin is as follows:

1. Polyglycidyl ether of an aromatic alcohol, i.e., a phenol type component—40 to 100 parts by weight;
2. Acrylate-terminated urethane prepolymer or diglycidyl ethers of polyalkyleneoxide glycols—10 to 40 parts by weight;
3. Polymethylated amine curative having two epoxide reactive hydrogen atoms—0.6 to 1.5, preferably 0.9 to 1.1 equivalents amine hydrogen per equivalent of amine hydrogen reactive component present in components 1 and 2.

Only through a selected combination of three key ingredients, (1) polyglycidyl ether of a phenol type compound; (2) acrylateterminated urethane prepolymer or diglycidyl ether of a polyalkyleneoxide glycol as a flexibilizing additive, and (3) an amine curative having two epoxide reactive hydrogen atoms represented by the formula:

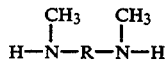

wherein R is alkylene or polyalkylene polyamine having from 2 to 20 carbon atoms, can the highly elastomeric epoxy resins having the excellent physical properties be generated.

The polyepoxides useful for practicing the present invention are those polyglycidyl ethers of phenolic type compounds having terminal 1,2-epoxy groups. The epoxide functionality of these glycidyl ethers is greater than one and the equivalent weight ranges from 150 to 1000. Polyglycidylethers of diphenylol propane or bisphenol A are particularly suited as polyepoxides for the production of coatings and resin products for civil engineering applications. Others include polyglycidyl ethers of phenol/formaldehyde and bisphenol/formaldehyde novolacs as well as the polyglycidyl ethers of tri(hydroxyphenyl)methane and tetra(hydroxyphenyl) ethanes and propanes.

One type of flexibilizing component in formulating the polyepoxide resin product is based upon a diglycidyl ether of a polyalkylene oxide or glycol such as those described in U.S. Pat. Nos. 3,297,745; 4,390,662; 4,719,268; 4,486,582 and 4,618,658, the subject matter of these patents being incorporated by reference. The diglycidyl ether of the polyalkylene oxide or polyalkylene glycol comprises the reaction product of epichlorohydrin and a polyalkylene glycol, such as the ethylene and propyleneoxide adducts of $C_2$ to $C_4$ polyols. For enhanced flexibilization of the polyepoxide resin, the molecular weight of the polyol should range from about 400 to 3000, preferably 1000 to 2000. Higher molecular weight glycols tend to cause phase separation in the formulated epoxy leading to poor physical properties.

Acrylate-terminated urethane prepolymers which comprise the reaction product of an isocyanate-terminated urethane prepolymer and an isocyanate reactive acrylate or methacrylate. Isocyanate-terminated prepolymers are prepared by reacting a polyfunctional isocyanate, typically an aromatic diisocyanate with a polyol, preferably a long chain polyether or polyester polyol, such as the ethylene and propyleneoxide adducts of $C_2$ to $C_4$ polyols. For enhanced flexibilization of the polyepoxide resin, the molecular weight (mw) of the polyol should range from about 400 to 3000, preferably 1000 to 2000. Flexibilizers utilizing a polyol having a molecular weight of less than 1000 generally lead to extremely viscous flexibilizers. Higher molecular weight glycols tend to cause phase separation in the formulated epoxy leading to poor physical properties. The preferred polyisocyanate prepolymer is prepared by any known means, for example, a 2000 mw polypropylene glycol is reacted with an 80/20 2,4/2,6-toluenediisocyanate mixture. Any polyisocyanate such as methylenediphenyldiisocyanate (MDI), isophoronediisocyanate (IPDI) or para-phenylenediisocyanate (PPDI) is also suitable.

The isocyanate-reactive acrylates and methacrylates typically used to prepare the acrylate-terminated urethane prepolymers are hydroxy alkylacrylates and methacrylates and these include. hydroxyacrylates such as hydroxymethyl acrylate or methacrylate, hydroxypropyl acrylate or methacrylate, 2-hydroxyethyl acrylate, 2-hydroxyethylhexyl methacrylate, hydroxybutyl methacrylate and the like. Typically the ester portion of the acrylate or methacrylate is from a $C_{1-8}$ alcohol.

The aliphatic amine curative for forming the cured polyepoxide resin product is one having a plurality of amino hydrogen atoms represented by the formula.

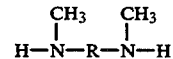

wherein R is alkylene or polyalkylene polyamine having from 2 to 20 carbon atoms, preferably $C_{3-8}$ polyethylenepolyamines. These amine curatives are polymethylated and have two terminal epoxide reactive secondary amine hydrogen atoms which result in epoxide products which tend to be less rigid and exhibit greater levels of elongation than do the polyepoxide resins cured with conventional amine curatives. Examples of amine curatives include of N,N'-dimethylethanediamine; N,N'-dimethylpropanediamine, N,N'-dimethylbutanediamine, N,N'-dimethylpentanediamine and N,N-dimethylhexanediamine; N,N',N''-trimethyldiethylenetriamine; N,N',N'',N'''-tetramethyltriethylenetetramine; N,N',N'',N''',N''''-pentamethyltetramethylenepentamine; N,N',N'',N''',N'''',N'''''-hexamethylpentamethylenehexamine. Generally, any aliphatic or polyalkylenepolyamine used as an epoxy curative may be polymethylated to form the desired secondary amines having two epoxide reactive amine hydrogen atoms. Cycloaliphatic amine curatives such as the polymethylated derivatives of diaminocyclohexane (DACH); bis(para-aminocyclohexyl)methane (PACM), and isophoronediamine (IPD) may enhance elongation but are so unreactive that they are not room temperature curable.

Several observations regarding formulation of the polyepoxide resin have been made that are valuable in determining the ultimate type of product desired. For example, the greater the amount of flexibilizer, the higher the percent elongation in the final product. The absence of flexibilizer results in an ambient cured epoxy with less than 15% elongation. The amine curative, and its functionality, (the number of active hydrogens present in the amine curative) has a considerable effect on the elongation properties. Also, the aliphatic chain length of the amine curative and of the flexibilizer has an effect on the elongation properties of the resin. As the functionality of the curative is lowered, crosslinking is reduced and therefore the amount of flexibilizer may be reduced to obtain a specified percent elongation.

To summarize, the physical properties and particularly the degree of elasticity is generally dependent upon the ratio of flexibilizer and amine and bisphenol A resin. The amount of curative determined by the number of active hydrogens present. Control of elasticity is primarily maintained via the polymethylated amine curative having only two secondary amine reactive hydrogen atoms. The flexibilizing additive supplies the soft or rubbery segment of the resulting polyepoxide resin providing for desired elasticity. The hard segment is comprised of the epoxy resin. The epoxy resin and the polyether are linked via the urethane bond generating an epoxy/urethane hybrid block copolymer.

The following examples are provided to illustrate various embodiments of the invention and are not intended to restrict the scope thereof.

EXAMPLE 1

PREPARATION OF ACRYLATE-TERMINATED URETHANE FLEXIBILIZER

A round bottom 3-neck reaction flask is purged with nitrogen and charged with 2.1 moles of 80/20 2,4 2,6-toluenediisocyanate and 1.0 g of MEHQ (a copmmercial polymerization inhibitor). The contents are heated to 70° C. under nitrogen atmosphere and agitation. 1.0 mole of the desired polyol, such as 1000, 2000, 3000 or 4000 mw polypropylene glycol, is added slowly over a 2-hour period while maintaining the temperature between 70° and 80° C. The temperature is held in this range for 6 hours with agitation. The reaction solution is cooled to 50° C. and 1.0 mole of 2-hydroxyethyl acrylate (HEA) is then added. After thorough mixing, 2 g of a commercial tin catalyst, i.e., dibutyltindilaurate is added with vigorous agitation. The resulting exotherm causes the temperature to rise from 50° to 75° C. The reaction temperature is held at 75° C. for 1 hour at which time the reaction solution is analyzed by IR for unreacted isocyanate. If the isocyanate content is less than 0.1% the product is cooled and collected. If it is not, the reaction solution is heated for an additional hour and reanalyzed. The addition order of the above example may be reversed without detriment to the final product. The 2-hydroxy ethyl acrylate may be added to the TDI followed by PPG addition. Caution must be noted. The exotherm from the HEA addition can cause a temperature rise of over 100° C. Therefore, the addition rate must be carefully controlled. The resultant reaction product of 2-hydroxy ethyl acrylate and a TDI-PPG 2000 isocyanate terminated urethane prepolymer is recovered and used as the flexibilizer component. It has been designated HEA-TDI-2000 ppg.

EXAMPLE 2

PREPARATION OF CURED EPOXY TEST SPECIMENS EFFECT OF AMINE CURATIVE

The elastomeric epoxy is prepared by thoroughly mixing the flexibilizer, aliphatic amine reactive component and epoxy resin. After degassing at 10mm Hg, an equivalent amount of amine curative based on the number of available active hydrogens is added to the resin and mixed thoroughly. The resulting solution is allowed to cure at ambient temperature for seven days in the desired mold shape. The test specimens are die cut and the tensile properties determined according to ASTM D-638 protocol. Table 1 shows the reactants and effect on the physical properties of the polyepoxide resin cured with N,N'-DMEDA while Table 2 shows results for a series of polymethylated diamines. Table 3 shows results when the epoxy resin is cured with conventional amines curative.

TABLE 1

| | Parts by Weight | | |
|---|---|---|---|
| EPON 828 | 70 | 60 | 50 |
| HEA-TDI-2000 PPG | 30 | 40 | 50 |
| N,N'-DMEDA | 17.2 | 15.3 | 13.3 |
| PROPERTIES | | | |
| SHORE D | 73 | 65 | 52 |
| TENSILE (PSI) | 2300 | 1400 | 810 |
| MODULUS (PSI) | 144500 | 78700 | 12450 |
| ELONGATION (%) | 250 | 310 | 420 |

TABLE 2

| | Parts by Weight | | | | |
|---|---|---|---|---|---|
| | DMEDA | DMPDA | DMHDA | TMDPTA | MTAHD |
| CURATIVE | | | | | |
| EPON 828 | 70 | 70.0 | 70.0 | 70.0 | 70.0 |
| HEA-TDI-2000 PPG | 30 | 30.0 | 30.0 | 30.0 | 30.0 |
| CURATIVE | 17.2 | 20.0 | 28.3 | 33.8 | 50.5 |
| PROPERTIES | | | | | |
| SHORE D | 73 | 74 | 65 | 68 | 35 |
| TENSILE (PSI) | 2300 | 2900 | 1700 | 1300 | 470 |
| MODULUS (PSI) | 144500 | 84870 | 33740 | 21610 | 2260 |

TABLE 2-continued

| | Parts by Weight | | | | |
|---|---|---|---|---|---|
| | DMEDA | DMPDA | DMHDA | TMDPTA | MTAHD |
| ELONGATION (%) | 250 | 151 | 286 | 347 | 448 |

DMEDA — N,N'-DIMETHYLETHYLENEDIAMINE
DMPDA — N,N'-DIMETHYL-1,3-PROPANEDIAMINE
DMHDA — N,N'-DIMETHYL-1,6-HEXANEDIAMINE
TMDPTA — N,N'N''-TRIMETHYLDIPROPYLENETRIAMINE
MTAHD — 9-METHYL-2,9,16-TRIAZAHEPTADECANE

TABLE 3

| | Parts by Weight | | |
|---|---|---|---|
| | NMEDA$^x$ | AEP$^{xx}$ | PACM$^{xxx}$ |
| CURATIVE | | | |
| EPON 828 | 70 | 70 | 70 |
| HEA-TDI-2000 PPG | 30 | 30 | 30 |
| CURATIVE | 9.7 | 15.3 | 20.6 |
| PROPERTIES | | | |
| SHORE D | 80 | 82 | 85 |
| TENSILE (PSI) | 5300 | 6600 | 4500 |
| MODULUS (PSI) | 145100 | 159500 | 139000 |
| ELONGATION (%) | 24 | 11 | 4 | x — NMEDA — N-methylethylenediamine
xx — AEP — aminoethylpiperazine
xxx — PACM — di(4-aminocyclohexyl)methane Tables 1, 2 and 3 show the effect of the Example 1 flexibilizer, HEA-TDI-2000 PPG cured with various polymethylated amines on the elasticity of the formulated epoxy resin.

Table 1 shows the excellent elongation with acceptable tensile strength at flexibilizer levels from 30 to 50 weight parts per 70 to 50 weight parts diglycidylether of bisphenol A.

Table 2 shows that excellent elongation can be obtained in epoxy resins using a variety of polymethylated polyamines. The elastomer obtained using DMPDA resulted in excellent elongation with excellent tensile strength.

Table 3 shows the effect of additional hydrogen atoms in the amine curative over that of the two hydrogen atoms in the polymethylated amine curative utilized in Tables 1 and 2. Even though the flexibilizer is present, elongation suffers tremendously by virtue of the additional hydrogen atom.

EXAMPLE 3

COMPARISON OF AMINE CURATIVES HAVING TWO AND MORE AMINE ATOMS

The procedure of Example 2 was repeated except the ethylene amines were varied as set forth in Tables 4 and 5. The purpose was to consider the affect of additional hydrogen atoms on the properties of the epoxy resin. Tables 4 and 5 set forth formulations and results.

TABLE 4

| | DMEDA | NMEDA | EDA |
|---|---|---|---|
| CURATIVE | | | |
| EPON 828 | 70 | 70 | 70 |
| HEA-TDI-2000 PPG | 30 | 30 | 30 |
| CURATIVE | 17.2 | 9.7 | 5.9 |
| PROPERTIES | | | |
| SHORE D | 73 | 80 | 85 |
| TENSILE (PSI) | 2300 | 5300 | 5252 |
| MODULUS (PSI) | 144500 | 145100 | 161800 |
| ELONGATION | 250 | 24 | 10 |

TABLE 4-continued

| | DMEDA | NMEDA | EDA |
|---|---|---|---|
| (%) | | | |

Table 4 shows comparative examples. When the amine curative has greater than 2 active hydrogens per molecule as in the cases for N-methylethylenediamine (NMEDA) with 3 active hydrogens and ethylenediamine (EDA) with 4 active hydrogens elasticity cannot be attained.

TABLE 5

| | DMEDA | NMEDA | EDA |
|---|---|---|---|
| CURATIVE | | | |
| EPON 828 | 70 | 70 | 70 |
| DER 732 | 30 | 30 | 30 |
| CURATIVE | 20.3 | 11.4 | 6.9 |
| PROPERTIES | | | |
| SHORE D | 73 | 80 | 85 |
| TENSILE (PSI) | 717 | 6859 | 6112 |
| MODULUS (PSI) | 509 | 321200 | 199900 |
| ELONGATION (%) | 294 | 26 | 5 |

Table 5 shows the effect of combining a diglycidyl polyoxyalkyl ether flexibilizer, DER 732, with a curative containing 2 active hydrogens per molecule, DMEDA, in comparison with a curative containing 3 or 4 active hydrogens per molecule, NMEDA and EDA. Again, as the level of amine hydrogens increases above 2, elasticity or elongation decreases rapidly.

What is claimed is:

1. In a curable epoxy resin comprising a polyglycidyl ether of a bisphenol having terminal 1,2-epoxy groups and an acrylate-terminated urethane prepolymer, the improvement for enhancing elasticity of the epoxy resin which comprises the utilization, in combination therewith, of a secondary amine curative having two epoxide reactive hydrogen atoms and represented by the formula:

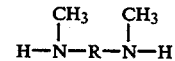

wherein R is alkylene or polyalkylene polyamine having from 2 to 20 carbon atoms, wherein the resin comprises:
(a) from 50 to 91% by weight based on the total weight of (a) and (b) of the polyglycidyl ether of a bisphenol, which is a diglycidyl ether of a bisphenol having an epoxide equivalent weight range of about 150 to 1000;
(b) from 9 to 50% by weight based on the total weight of (a) and (b) of the acrylate-terminated urethane prepolymer, wherein the acrylate-terminated urethane prepolymer is difunctional and comprises the reaction product of an isocyanate-terminated urethane prepolymer and an isocyanate-reactive (meth)acrylate, wherein said urethane prepolymer comprises the reaction product of a polyfunctional isocyanate with a polyol which has a weight average molecular weight range of 400 to about 3000; and (c) an amount of the amine curative providing from about 0.6 to 1.5 equivalents of amine hydrogen per equivalent of amine hydrogen reactive group in components (a) and (b)

2. The epoxy resin of claim 1 wherein the diglycidyl ether of a bisphenol is selected from the group consisting of a diglycidyl ether of bisphenol A and diglycidyl ether of bisphenol F.

3. The epoxy resin of claim 1 wherein the secondary amine curative is a polymethylated aliphatic secondary amine selected from the group consisting of N,N'-dimethylethanediamine; N,N'-dimethylpropanediamine; N,N'-dimethylbutanediamine; N,N'-dimethylpentanediamine; N,N'-dimethylhexanediamine; N,N',N''-trimethyldiethylenetriamine; N N',N'',N'''-tetramethyltriethylenetetramine; N,N',N'',N''',N''''-pentamethyltetramethylenepentamine; and N,N',N'',N''',N'''',N'''''-hexamethylpentamethylenehexamine.

4. The epoxy resin of claim 3 wherein the acrylate-terminated urethane prepolymer is the reaction product of a hydroxy acrylate with an isocyanate terminated prepolymer formed by the reaction of an isocyanate selected from the group consisting of toluenediisocyanate, methylenedi(phenylisocyanate) and isophoronediisocyanate and a polyether polyol selected from the group consisting of polyethylene glycol, polypropylene glycol and polytetramethylene glycol.

* * * * *